Patented July 7, 1942

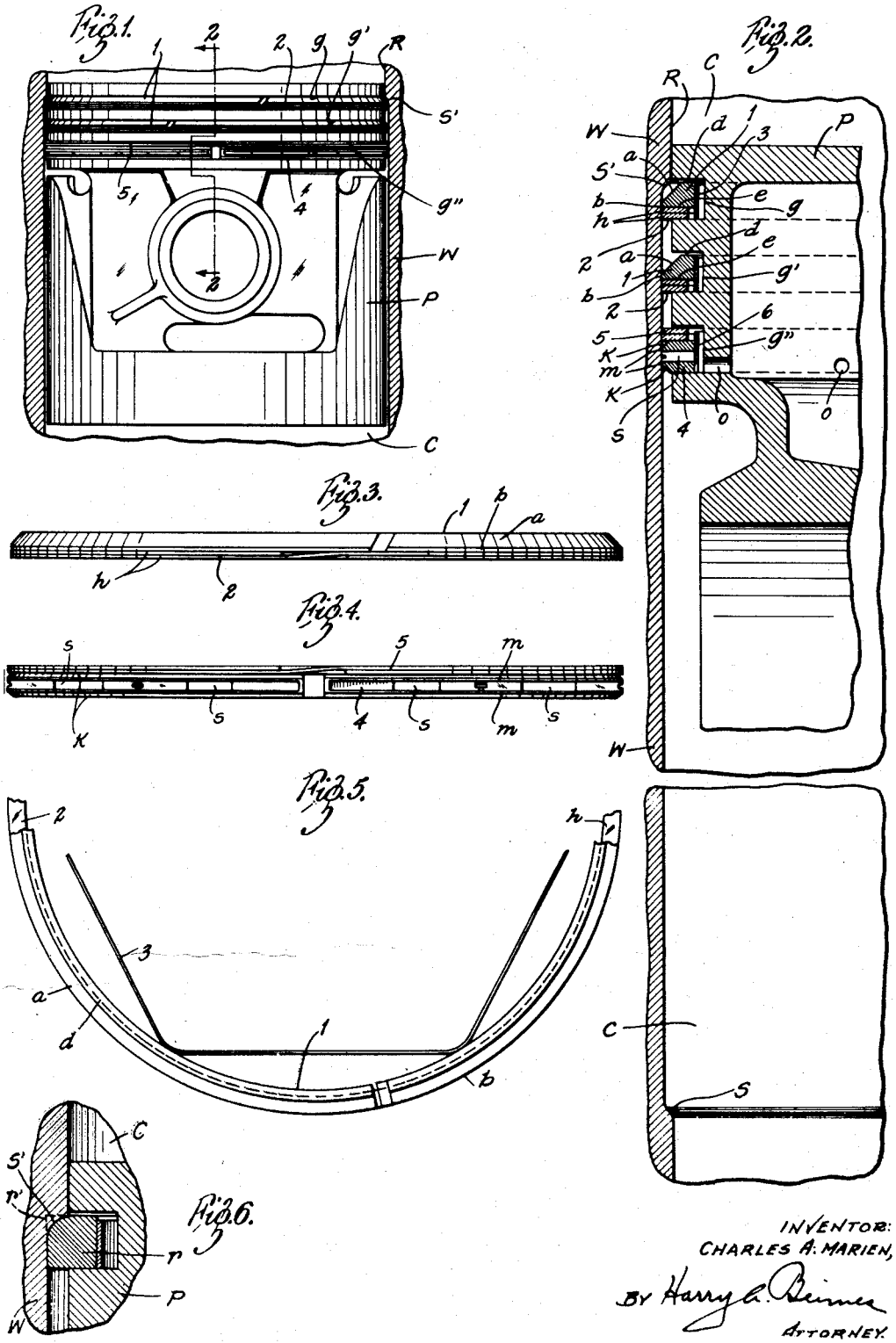

2,288,911

UNITED STATES PATENT OFFICE 2,288,911

PISTON RING ARRANGEMENT

Charles A. Marien, St. Louis, Mo., assignor to Ramsey Accessories Manufacturing Corporation, St. Louis, Mo., a corporation of Missouri Application January 27, 1940, Serial No. 315,909

3 Claims. (Cl. 309—45)

My invention has relation to improvements in piston sealing means and it consists of the novel features of construction more fully set forth in the specification and pointed out in the claims.

The invention is primarily directed to a piston ring arrangement in the head of the piston with reference to the construction of the rings themselves. In other words, the rings are provided with bevel faces and are disposed in the piston ring grooves so that both the top and bottom rings will present bevel faces outwardly at the upper and lower limits of the ring travel. The advantage of this arrangement is that the rings will not strike the shoulders caused by wear in an old cylinder when the piston is equipped with new rings.

It is a matter of common knowledge in the automobile repair industry that after an engine has been operating for a considerable time both the rings and the cylinder wall wear from continual rapid reciprocation of the piston within the cylinder. According to correct practice, before new rings are inserted in a piston the ridge formed at the top of the cylinder and the shoulder formed at the bottom thereof due to this wear should be removed by a suitable grinding or boring tool. However this is a rather tedious job and often repair shops are not properly equipped to perform this operation so that it is neglected by many mechanics, or at least slighted, and the shoulders caused by wear are allowed to remain in the cylinder.

When a piston is equipped with new piston rings of standard construction, the rings will foul these shoulders at both ends of the piston stroke, causing damage to the rings before they have even been broken in. With my improved construction of ring and arrangement of the rings within the piston I circumvent the ill effects of the fouling of the rings against these shoulders in those cases where the mechanic does not properly condition the cylinder. Of course, where the cylinder is properly conditioned my improved rings and ring arrangement possess other functions not hitherto obtained by piston rings of other constructions so far as I am aware.

Among the other advantages of my improved rings is that they permit of an adequate supply of oil over the cylinder wall on both the upstroke and the downstroke, at the same time maintaining an effective compression seal and the prevention of oil pumping, that is, excessive oil flow past the piston into the combustion space of the cylinder.

These advantages will be better apparent from a detailed description of the invention in connection with the accompanying drawing, in which:

Figure 1 shows fragments of a cylinder wall and a side elevation of a piston therein equipped with my improved rings and arranged in the piston head according to my invention; Fig. 2 is an enlarged vertical section through the piston taken on the line 2—2 of Fig. 1, parts of the piston and cylinder wall being broken away; Fig. 3 is a side elevation of my improved compression ring that is disposed in the upper grooves of the piston; Fig. 4 is a side elevation of my improved oil ring that is disposed in the bottom groove of the piston; Fig. 5 is a fragmentary plan view of the ring shown in Fig. 3, together with the spring expander adapted for cooperation with one of the ring elements; Fig. 6 is a sectional detail of a portion of a piston and cylinder wall showing a worn piston ring at the top of its travel, and also showing how the cylinder wall is caused to wear by the continual travel thereover of the rings.

Referring to the drawing, P represents a piston of conventional construction within an engine cylinder C, the wall W of which has been worn so as to have a ridge R formed at the top of the cylinder and a shoulder S formed at the bottom of the ring travel thereof. Of course the formation of the ridge R also results in forming a shoulder S' at the top of the piston ring travel. Of course this wear is not uniform in all cylinders and there may be instances in which the shoulder S at the bottom of the ring travel is not very pronounced. However it will occur in many instances and the upper shoulder S' is invariably present in badly worn cylinders.

Of course, when the engine is new there is no wear in the cylinder and no wear on the piston rings, but as the engine is operated both the cylinder and the rings will gradually wear until ultimately the rings may be worn to a shape indicated in the old piston ring $r$ shown in Fig. 6. Since the ring $r$ and the shoulder S' wear together, it is obvious that the ring $r$ will fit the shoulder S' as shown (Fig. 6). However, if a new ring with a sharp corner, such as indicated by $r'$ (Fig. 6) is inserted in the piston P, this sharp corner $r'$ will foul the shoulder S' and the new ring will be damaged before it even has an opportunity to be broken in. It is to overcome this possibility when pistons are equipped with new rings that I have provided the improved rings and ring arrangement about to be described.

Referring to Fig. 2, the piston P is equipped with three ring grooves g, g' and g", in the two upper grooves g and g' of which are disposed what I choose to call compression rings composing three ring elements. The upper ring element 1 is preferably a cast iron split ring having an outwardly presented bevel face a and a very narrow cylinder contacting face b. On account of the bevel face a inclining inwardly toward the top, the top plane surface d is approximately one-half the width of the bottom plane surface e.

A helical ring 2 comprising two thin coils h, h is also disposed within the groove g adjacent to the bottom plane surface e of the ring 1. A spring expander 3 of polygonal shape is disposed in the groove g behind the ring 1, and bears outwardly against said ring to augment the tension thereof, and accordingly increase the unit pressure of the narrow cylinder contacting face b against the cylinder wall W. It will be observed that the radial depth of the helical ring 2 is less than that of the cast iron ring 1 so that the expander 3 will not contact with the helical ring 2 which bears against the cylinder wall W only with the pressure inherent within the ring 2 itself.

Since the ring 1 in the upper groove g is disposed in said groove so as to present its bevel face a upwardly, no part of said ring 1 will ever contact with the shoulder S' when the ring 1 reaches the upward limit of its travel. Thus the upwardly presented bevel face a makes it impossible for the ring to foul the ridge R and be damaged by contact therewith.

The construction of the ring assembly in the groove g' is the same as that of the ring in the groove g. However, in the bottom groove g" a vented cast iron ring 4 is provided, and has seated in the groove with it a helical ring 5 similar to the helical ring 2 except that the ring 5 is disposed above the ring 4 as shown in Fig. 2. There is also a spring expander 6 disposed in the groove g" in contacting relation with the ring 4 so as to augment the pressure thereof against the cylinder wall.

Outwardly presented bevel faces k, k are formed on the ring 4 for two purposes. In the first place the bevels k, k reduce the cylinder contacting surfaces m, m to extremely narrow edges, thereby obtaining high unit pressure of the ring against the cylinder wall and at the same time the lower bevel surface k provides clearance so that the ring 4 will not foul the shoulder S at the bottom of the ring travel. Thus both the top ring 1 and the bottom ring 4 are provided with bevels disposed in opposite directions so as to provide clearance for the rings at both the top and the bottom of their travel, thereby making it impossible for the rings to impinge on the shoulders S' and S and be unseated and damaged thereby.

The piston ring groove g" is provided with oil drainage ports o according to established practice to permit the discharge of excess oil through the piston wall so that it may ultimately find its way back into the crankcase.

The oil ring assembly comprising the cast iron ring 4, the helical ring 5 and expander 6 is similar in construction to the ring assembly shown in Fig. 3 of my Patent No. 2,128,372 and will not be claimed herein per se. However as far I am aware the compression ring assembly comprising ring 1, ring 2 and expander 3 is new, as is also the arrangement of the rings in the piston whereby the upper and lower rings are each provided with outwardly presented bevels so as to provide clearance between the rings and the shoulders of the cylinder that are caused by wear and are formed at the upper and lower limits of the ring travel.

In the operation of a piston equipped with my improved ring assembly, on the upstroke of the piston a certain amount of oil will pass over the bevel faces a, a of the rings 1, 1 and it will be forced past the ring assembly due to the hydrodynamic pressure created by the rapidly moving piston. However, on the downstroke of the piston the surplus oil on the cylinder wall will be removed therefrom by the closely fitting coils of the helical ring 2. The helical ring 2, together with the cylinder contacting face b (which bears against the cylinder wall with high unit pressure), will cooperate to prevent loss of compression past the ring assembly on the power stroke of the piston. On the downstroke of the piston the bevel surface k of ring 4 permits oil to pass the ring 4 and discharge through the slots s thereof, while on the upstroke the oil on the cylinder wall is picked up by the helical ring 5 and distributed over the surface of the cylinder wall. Thus the ring arrangement herein described operates effectively to hold compression in the cylinder, while at the same time permitting distribution of oil over the cylinder wall in sufficient quantity for proper lubrication thereof, and at the same time removing any excess of oil that accumulates on the cylinder wall.

As the piston travels upwardly some of the oil that passes the rings 1, 1 will be distributed over the cylinder wall by the helical rings 2, 2 and some will pass the helical rings 2, 2 and be picked up by the helical ring 5 for redistribution over the cylinder wall between the ring in the groove g and the ring in the groove g".

As the piston travels downwardly some of the oil that passes the ring 4 will be scraped from the cylinder wall by the helical ring 5, and some will pass the ring 5 for redistribution over the cylinder wall.

It should be apparent that between the top and the bottom rings there is an adequate supply of oil for lubrication of the cylinder wall, while the amount of oil that is carried upwardly by the rings into the combustion space of the cylinder is negligible. Thus with the present arrangement of piston rings, excellent oil control is accomplished with a negligible amount of consumption, while at the same time maintaining adequate piston wall lubrication and preventing loss of compression.

Having described my invention, I claim:

1. In combination with a piston having a plurality of ring grooves in the head portion thereof, a piston ring assembly comprising a split cast iron ring, a helical steel ring and an expander for the cast iron ring in each groove, the cast iron ring for the top groove being above the helical ring and having an outwardly presented bevel face between its peripheral surface and its top surface, and the cast iron ring in the bottom groove being below the helical ring and having an outwardly presented bevel face between its peripheral surface and its bottom surface.

2. In combination with a piston having a plurality of ring grooves in the head portion thereof, a piston ring assembly comprising a split relatively wide cast iron ring and a relatively narrow steel ring in each groove, the cast iron ring for the top groove being above the steel ring and having an outwardly and upwardly presented bevel face, and the cast iron ring for the bottom groove being below the steel ring and having an outwardly and downwardly presented bevel face.

3. In combination with a piston having a plurality of ring grooves in the head portion thereof, a piston ring assembly comprising a split relatively wide cast iron ring and a relatively narrow steel ring in each groove, the cast iron ring for the top groove being above the steel ring and having an outwardly and upwardly presented bevel face, and the cast iron ring for the bottom groove being vented and disposed below the steel ring and having an outwardly and downwardly presented bevel face.

CHARLES A. MARIEN.